(12) United States Patent
Stiglic et al.

(10) Patent No.: US 10,984,301 B2
(45) Date of Patent: Apr. 20, 2021

(54) METHOD FOR LIMITING THE LEVEL OF A MODULATED SIGNAL RECEIVED BY A TAG AND CORRESPONDING LIMITER

(71) Applicant: STMicroelectronics razvoj polprevodnikov d.o.o., Ljubljana (SI)

(72) Inventors: Maksimiljan Stiglic, Maribor (SI); Iztok Bratuz, Ankaran (SI); Albin Pevec, Ljubljana (SI); Roman Benkovic, Ljubljana (SI)

(73) Assignee: STMICROELECTRONICS RAZVOJ POLPREVODNIKOV D.O.O., Ljubljana (SI)

( * ) Notice: Subject to any disclaimer, the term of this patent is extended or adjusted under 35 U.S.C. 154(b) by 0 days.

(21) Appl. No.: 16/442,811

(22) Filed: Jun. 17, 2019

(65) Prior Publication Data
US 2019/0385036 A1 Dec. 19, 2019

(30) Foreign Application Priority Data
Jun. 19, 2018 (EP) .................................. 18178585

(51) Int. Cl.
*G06K 19/07* (2006.01)
*H02H 9/04* (2006.01)
*H04L 27/06* (2006.01)

(52) U.S. Cl.
CPC ........... *G06K 19/0724* (2013.01); *H02H 9/04* (2013.01); *H04L 27/06* (2013.01)

(58) Field of Classification Search
CPC .............................. G06K 19/0724; H02H 9/04

USPC .................................................. 235/492, 487
See application file for complete search history.

(56) References Cited

U.S. PATENT DOCUMENTS

| | | | |
|---|---|---|---|
| 2004/0044493 A1* | 3/2004 | Coulthard | G06Q 10/10 702/122 |
| 2005/0111401 A1* | 5/2005 | Terry | H03G 3/3078 370/328 |
| 2009/0243717 A1* | 10/2009 | Bonthron | H03F 3/45089 330/10 |
| 2009/0322484 A1* | 12/2009 | Toriyama | G06K 19/0724 340/10.1 |

(Continued)

FOREIGN PATENT DOCUMENTS

| | | |
|---|---|---|
| EP | 2138961 A1 | 12/2009 |
| EP | 2752792 A1 | 7/2014 |
| WO | 2009027465 A2 | 3/2009 |

*Primary Examiner* — Allyson N Trail
(74) *Attorney, Agent, or Firm* — Slater Matsil, LLP

(57) ABSTRACT

An integrated circuit, includes: an input configured to receive an induced signal that is modulated according to a protocol belonging to the group including protocols using ASK modulation and protocols using OOK modulation; a detection circuit configured to detect the modulation of the induced signal; a decoding circuit configured to detect the protocol; a configurable limiter configured to limit a level of the induced signal and having a first configuration adapted to protocols using ASK modulation and a second configuration adapted to protocols using OOK modulation; and a control circuit configured to set the limiter in the first configuration until a protocol is detected, and to switch the limiter from the first configuration to the second configuration in response to a protocol using OOK modulation being detected.

20 Claims, 4 Drawing Sheets

(56) References Cited

U.S. PATENT DOCUMENTS

| | | | |
|---|---|---|---|
| 2012/0049949 A1* | 3/2012 | Nito | H04L 25/061 |
| | | | 329/300 |
| 2012/0057883 A1* | 3/2012 | Andre | H04B 10/2587 |
| | | | 398/208 |
| 2014/0139356 A1* | 5/2014 | Vaquin | G08G 1/16 |
| | | | 340/905 |
| 2018/0062385 A1* | 3/2018 | Chen | H02H 1/0007 |
| 2019/0103149 A1* | 4/2019 | Hasbun | G11C 7/1012 |

* cited by examiner

METHOD FOR LIMITING THE LEVEL OF A MODULATED SIGNAL RECEIVED BY A TAG AND CORRESPONDING LIMITER

CROSS-REFERENCE TO RELATED APPLICATIONS

This application claims priority to European Patent Application No. 18178585.8, filed on Jun. 19, 2018, which application is hereby incorporated herein by reference.

TECHNICAL FIELD

Embodiments of the present invention are related to the field of wireless communication, especially near field communication (NFC) and, more particularly to limiting a voltage induced on a tag antenna to a predetermined voltage.

BACKGROUND

Near field communication (NFC) is a set for standards for wireless apparatuses, in particular smartphones and similar devices, utilized to establish radio communication between two devices by touching them together or bringing them into proximity, typically at a distance of 10 cm or less.

NFC uses electromagnetic induction between two loop antennas located within each other's near field, effectively forming an air-core transformer. It operates for example at 13.56 MHz. NFC involves an initiator and a target. The initiator or reader actively generates an RF field that can power a passive target, an unpowered chip called a transponder or "tag". This enables NFC targets to take simple form factors as stickers, key fobs, or cards that do not use batteries.

The communication from the reader to the tag is effected by amplitude modulation of a carrier signal by the reader, respecting some standards.

The tag may be passive or active. In the first case, the tag does not generate electromagnetic field, whereas in the second case it generates also an electromagnetic field, and the communication between the reader and the tag uses an Active Load Modulation (ALM).

NFC technology is standardized in ISO/IEC 18 092, ISO/IEC 21 481 and NFC FORUM documents but incorporates a variety of pre-existing standards including type A protocol and type B protocol which are standardized in ISO/IEC 14443.

Type A protocol, also known as ISO/IEC 14443A and NFC-A technology, is based on On Off Keying—OOK—modulation using modified Miller pulse position. The start of frame (SOF) symbol is composed of one pulse position. The start of frame, SOF symbol is composed of one pulse only. The end of frame, EOF is marked by a non-modulated period.

Type B protocol, also known as ISO/IEC 14443B and NFC forum NFC-B technology, is based on Amplitude-Shift Keying—ASK—modulation and employs direct bit coding. The start of frame (SOF) symbol includes ten to eleven low bits followed by two to three high bits. The end of frame (EOF) is represented by some low bits.

FeliCa protocol, also called NFC-F technology, is standardized in JIS.X.6319 and based on ASK modulation and is quite different. The data is Manchester coded on a sub-carrier clock of 212 kHz or 424 kHz. The start of frame has a train of 48 or more unmodulated sub-carrier clocks (known as preamble). Beginning of data is marked by a first change in phase of the sub-carrier. End of frame is signaled by the data.

In order to protect a passive tag from destruction, clamp protection is needed. There are also some system specifications which require implementing the clamp, for example the specifications of loading effect in ISO/IEC 14443.

However, in multiprotocol tags which receive ASK and OOK modulation, a limiter implementing such a clamp optimized for a protocol using ASK modulation has a behavior that isn't optimal for type A protocol that uses OOK modulation.

In fact, if OOK modulation is detected, the limiter can be switched off if the tag receives a signal having a low amplitude for example remaining 5% of an OOK modulation. As a consequence, the received signal in tag antenna will have a high amplitude and thus the threshold of rising edge detection of modulated pulses has to be put relatively high. Due to this, the rising edge of a modulated pulse is detected late which results in a large variations of Frame Delay Time (FDT) for which tight tolerance range is specified.

The disadvantage of using this concept is that the rising edge of modulated pulses has to be detected as soon as possible which means that the threshold has to be put relatively low, so the variation of Frame delay Time will be lower.

SUMMARY

There is accordingly a need to propose a solution which permits to change the limiter behavior from a behavior optimized for protocols using ASK modulation to a behavior optimized for type A protocol which uses OOK modulation, in case type A protocol is detected.

In a first aspect, a method is proposed for limiting the level of an induced signal received by a tag from a reader, the induced signal being modulated according to a protocol belonging to the group including protocols using ASK modulation and protocols using OOK modulation, the method including:

providing the tag with a configurable limiter having a first configuration adapted to protocols using ASK modulation, and a second configuration adapted to protocols using OOK modulation;

setting the limiter in the first configuration until protocol is detected and if a protocol using OOK modulation is detected, switching the limiter from the first configuration to the second configuration.

In other words, if a signal is received by the tag, the limiter is first set in the first configuration optimized for protocols using ASK modulation and if protocols using ASK modulation are detected, the limiter stays in the same first configuration. If a protocol using an OOK modulation is detected, the limiter switches from the first configuration to the second configuration which is optimized for OOK modulation.

In an embodiment, the induced signal is modulated according to a protocol belonging to the group including protocols A and B of ISO/IEC14443 standard and protocol F of JIS.X.6319 standard, and if protocol A is detected, switching the limiter from the first configuration to the second configuration.

In an embodiment, the induced signal has modulated pulses and switching from the first configuration to the second configuration is done before the reception of the last modulated pulse of the induced signal. As Frame Delay Time is measured from the rising edge of the last modulated pulse, the limiter has preferably to be in the second configuration during the reception of the last modulated pulse to assure a lower variation of Frame Delay Time.

It's not mandatory that the limiter switches from the first configuration to the second configuration only before the last modulated pulse. The limiter can switch from the first configuration to the second configuration for example two pulses before the reception of the last modulated pulse or once the A protocol is detected.

In another aspect, an integrated circuit is proposed having an input configured to receive an induced signal, the induced signal being modulated according to a protocol belonging to the group including protocols using ASK modulation and protocols using OOK modulation, the integrated circuit including:
  detection circuit configured to detect the modulation;
  decoding circuit configured to detect the protocol;
  a configurable limiter configured to limit the level of the induced signal and having a first configuration adapted to protocols using ASK modulation and a second configuration adapted to protocols using OOK modulation;
  control circuit configured to set the limiter in the first configuration until protocol is detected, and configured to switch the limiter from the first configuration to the second configuration if a protocol using OOK modulation is detected.

In an embodiment, the induced signal is modulated according to a protocol belonging to the group including protocols A and B of ISO/IEC14443 standard and protocol F of JIS.X.6319 standard, and the control circuit are configured to switch the limiter from the first configuration to the second configuration if protocol A is detected.

In an embodiment, the induced signal has modulated pulses and the control circuit are configured to switch from the first configuration to the second configuration before the input receives the last modulated pulse of the induced signal.

According to one embodiment, in the first configuration, the limiter is configured to reduce a limiter's current when the amplitude of the induced signal is reduced.

According to an embodiment, in the second configuration, the limiter is configured to no longer reduce the limiter's current when the amplitude of the induced signal is reduced.

According to an embodiment, in the second configuration, the limiter is configured to keep the value of its impedance which is established before that the input receives the modulated pulses, unchanged during the reception of the induced signal.

Not varying the impedance leads to a proportional amplitude of the induced signal to the amplitude of the reader's signal.

In this case, the detection level of modulated pulses can be put lower so the detection of rising edges of modulated pulses will be faster and the variation of Frame Delay Time will be lower.

According to an embodiment, the limiter includes an NMOS transistor coupled in series with a first switch and a circuit acting as a Zener diode between a voltage terminal and ground, the first switch being controlled by the control circuit, the control circuit being configured to open the first switch in the first configuration, and to close the first switch in the second configuration. The circuit maybe a Zener diode or a circuit functionally equivalent to a Zener diode.

According to an embodiment, the integrated circuit also includes a PMOS transistor coupled in series with a second switch and a resistive capacitive circuit between the voltage terminal and ground, the second switch being controlled by the detection circuit, the detection circuit being configured to open the second switch once detection circuit detect modulated pulses of the induced signal, and being configured to close the second switch if a non-modulated signal is received.

In another aspect, a limiter is proposed as belonging to the integrated circuit defined above.

In another aspect, a transponder is proposed including the integrated circuit defined above.

BRIEF DESCRIPTION OF THE DRAWINGS

Other features and advantages of the present invention will appear from the following description, given only by the way of examples and in view of the following drawings in which.

DETAILED DESCRIPTION OF ILLUSTRATIVE EMBODIMENTS

Figure 1:
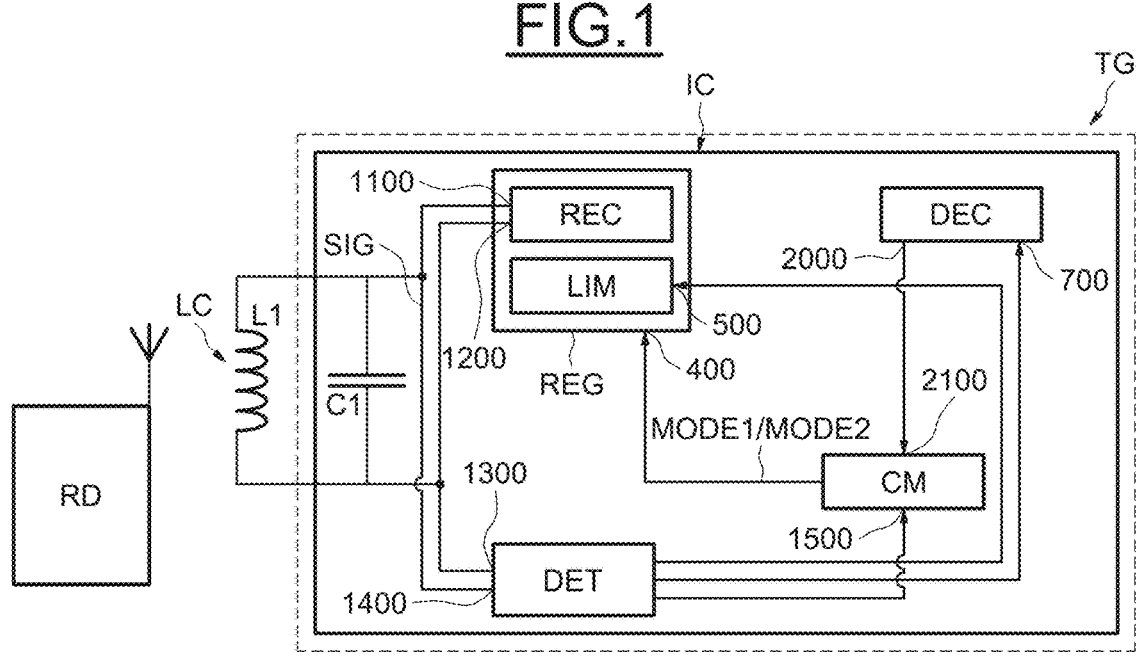
FIGS. 1, 2, 3A, 3B and 3C schematically illustrate different embodiments of the proposed invention.

FIG. 1 shows a tag TG also called a transponder configured to communicate with a reader RD.

The communication from the reader RD to the tag TG is performed by amplitude modulation of a carrier signal by the reader.

The tag TG includes an integrated circuit IC and an antenna coil L1. It also includes an integrated capacitor C1 which forms with antenna coil L1 a resonant circuit LC.

The resonance frequency of the resonant circuit LC is for example 15 MHz.

The integrated circuit IC includes a regulating block REG which includes a rectifier REC coupled to the resonant circuit LC by terminals 1100 and 1200 and configured to extract tag power supply from an induced signal received by the tag, and a limiter LIM coupled in series to the rectifier REC and configured to control the amplitude or level of the induced signal SIG.

The rectifier REC and the limiter LIM can be also coupled in parallel.

The limiter LIM is also coupled to control circuit CM which is configured to set the limiter LIM by an input 400 in a first configuration MODE1 and to switch the limiter LIM from the first configuration MODE1 adapted to protocols using ASK modulation to a second configuration MODE2 adapted to protocols using OOK modulation.

The limiter LIM is also coupled to detection circuit DET by an input 500, which is configured to detect if the induced signal SIG received at inputs 1300 and 1400 has been modulated according to an OOK modulation or an ASK modulation.

The detection circuit DET is also coupled to control circuit CM by a terminal 1500 and is configured to notify the control circuit CM about the result of the detection.

The integrated circuit IC also includes decoding circuit DEC which is coupled to detection circuit DET by an input 700. The decoding circuit DEC is also coupled to the control circuit CM by terminals 2000 and 2100.

The decoding circuit is configured to detect the protocol type and then to notify the control circuit CM about the result of the detection.

Decoding circuit DEC is also configured to decode the induced signal SIG.

The structure and the operation of the decoding circuit are well known by the man skilled in the art and may be implemented with decoders known in the art.

Figure 2:
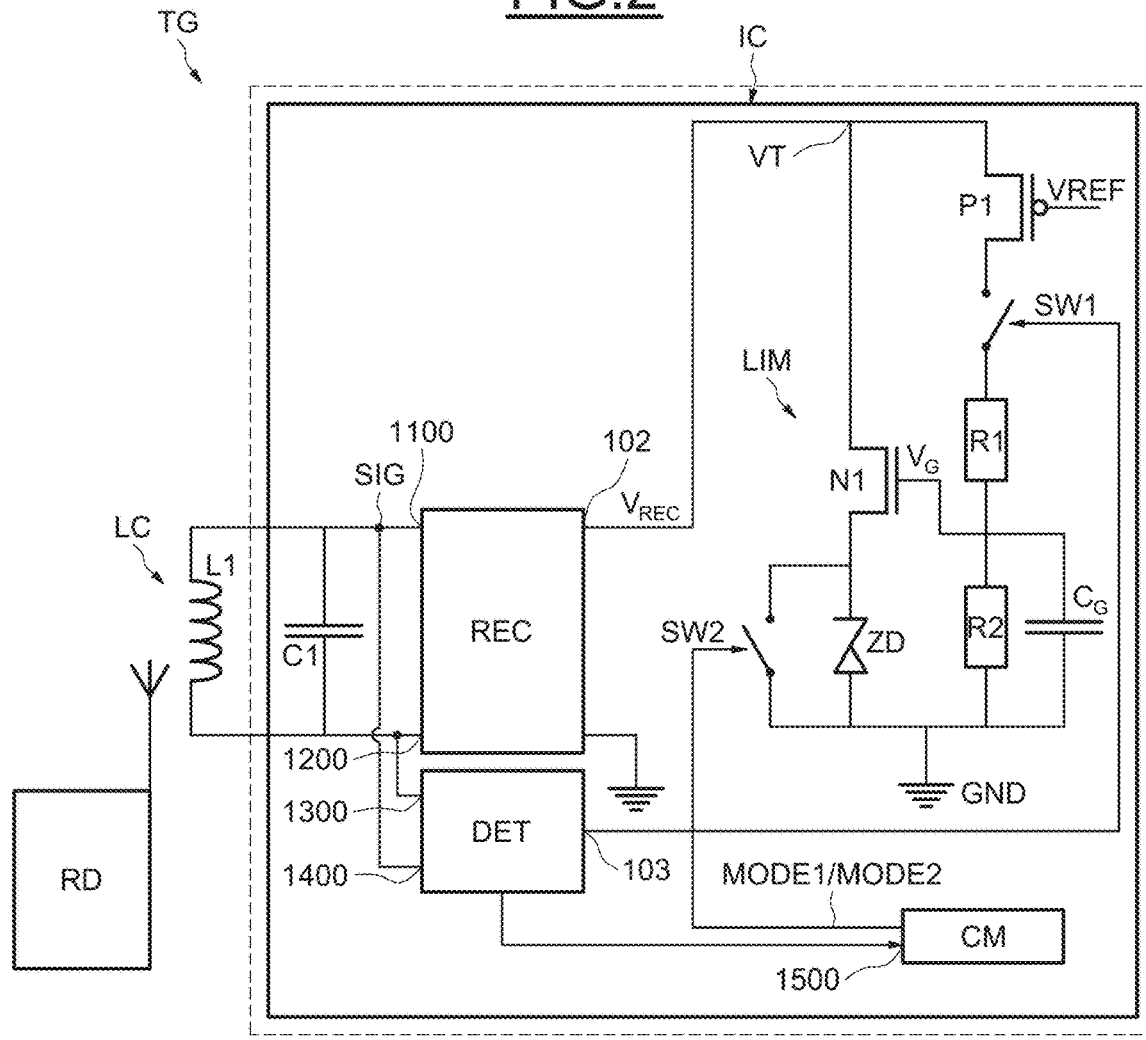

FIG. 2 shows a detailed part of the integrated circuit IC according to the invention.

The resonant circuit LC is configured to send the induced signal SIG to the rectifier REC and to the detection circuit DET.

The rectifier REC is configured to create a rectified voltage VREC by an output 102.

The limiter LIM includes an NMOS transistor N1 coupled in series with a second switch SW2 and a circuit acting as a Zener diode ZD between a voltage terminal VT and ground.

The circuit acting as a Zener diode is represented here by a Zener diode ZD.

It also includes a PMOS transistor P1 coupled in series with a first switch SW1 and a resistive capacitive circuit including a resistor divider formed of two resistors R1 and R2 and a capacitor CG, between the voltage terminal VT and ground GND.

The limiter may also include other components not relevant for the present invention.

The voltage terminal VT is connected to the output 102 of the rectifier.

The voltage terminal is coupled to the drain of the NMOS transistor N1 and to the source of the PMOS transistor P1.

A reference voltage VREF is applied to the gate of the PMOS transistor P1 and a control voltage VG to the gate of the NMOS transistor N1.

The first switch SW1 is controlled by the detection circuit DET by an output 103, which is configured to open the first switch SW1 once detection circuit detects the induced signal SIG and is configured to close the first switch SW1 when a non-modulated signal is received between two modulated pulses.

The second switch SW2 is controlled by the control circuit CM which is configured to open the second switch SW2 in the first configuration MODE1, and to close the second switch SW2 in the second configuration MODE2.

Figure 3A:
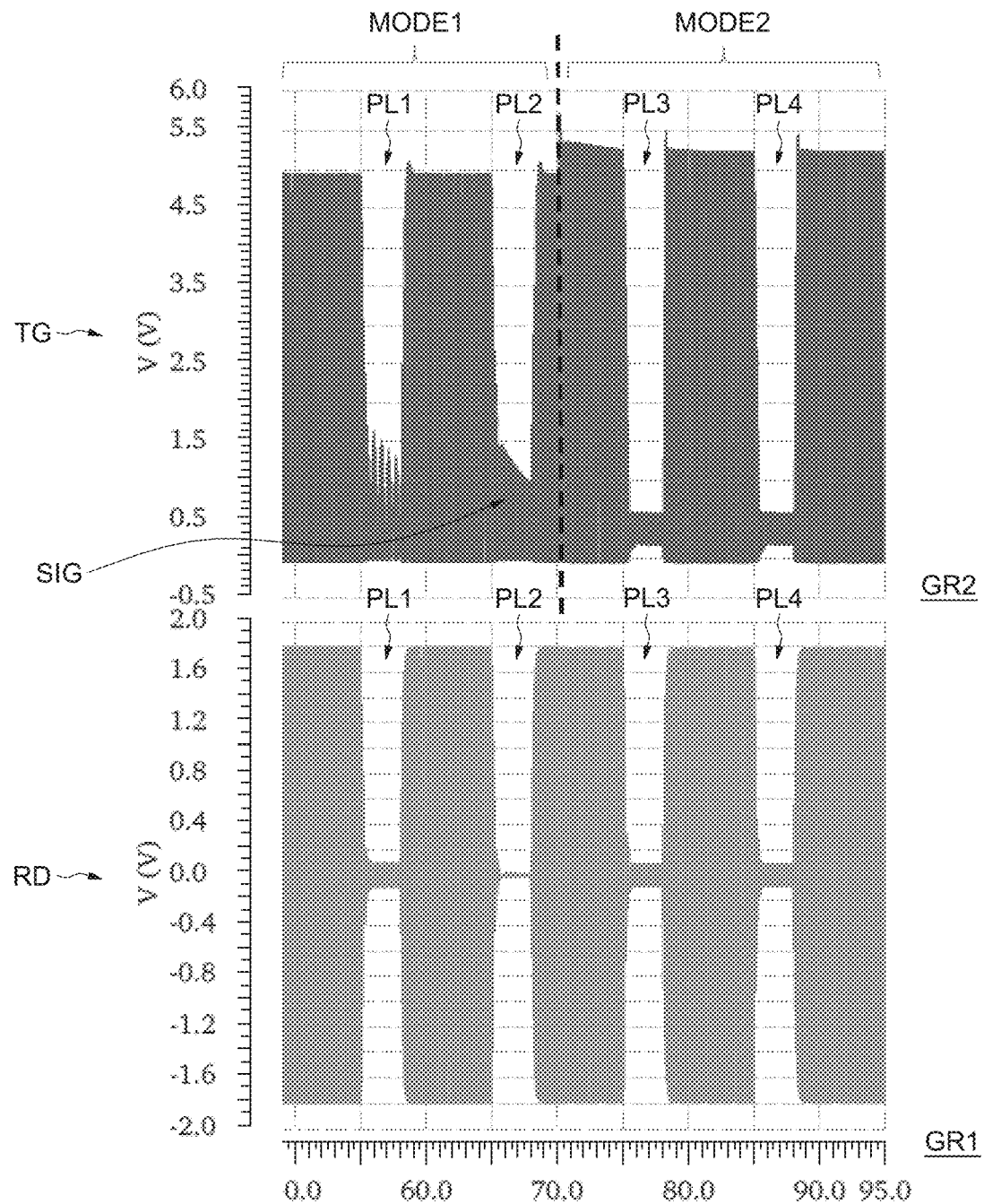

FIG. 3A shows a first graph GR1 illustrating the evolution of the amplitude of the induced signal SIG sent by the reader RD with regard to time, and a second graph GR2 illustrating the evolution of the amplitude of the induced signal SIG received by the tag TG with regard to time.

In first graph GR1, two OOK pulses PL1 and PL2 are sent to the tag TG while the limiter LIM is in the first configuration MODE1. As a matter of fact, the protocol has not yet been detected. The first pulse PL1 has a remaining amplitude of 5% of non-modulated signal.

The second pulse PL2 has a remaining amplitude of 0% of non-modulated signal.

The first switch SW1 is initially closed to let the resistive capacitive circuit perform a regulation loop operation.

Figure 3B:
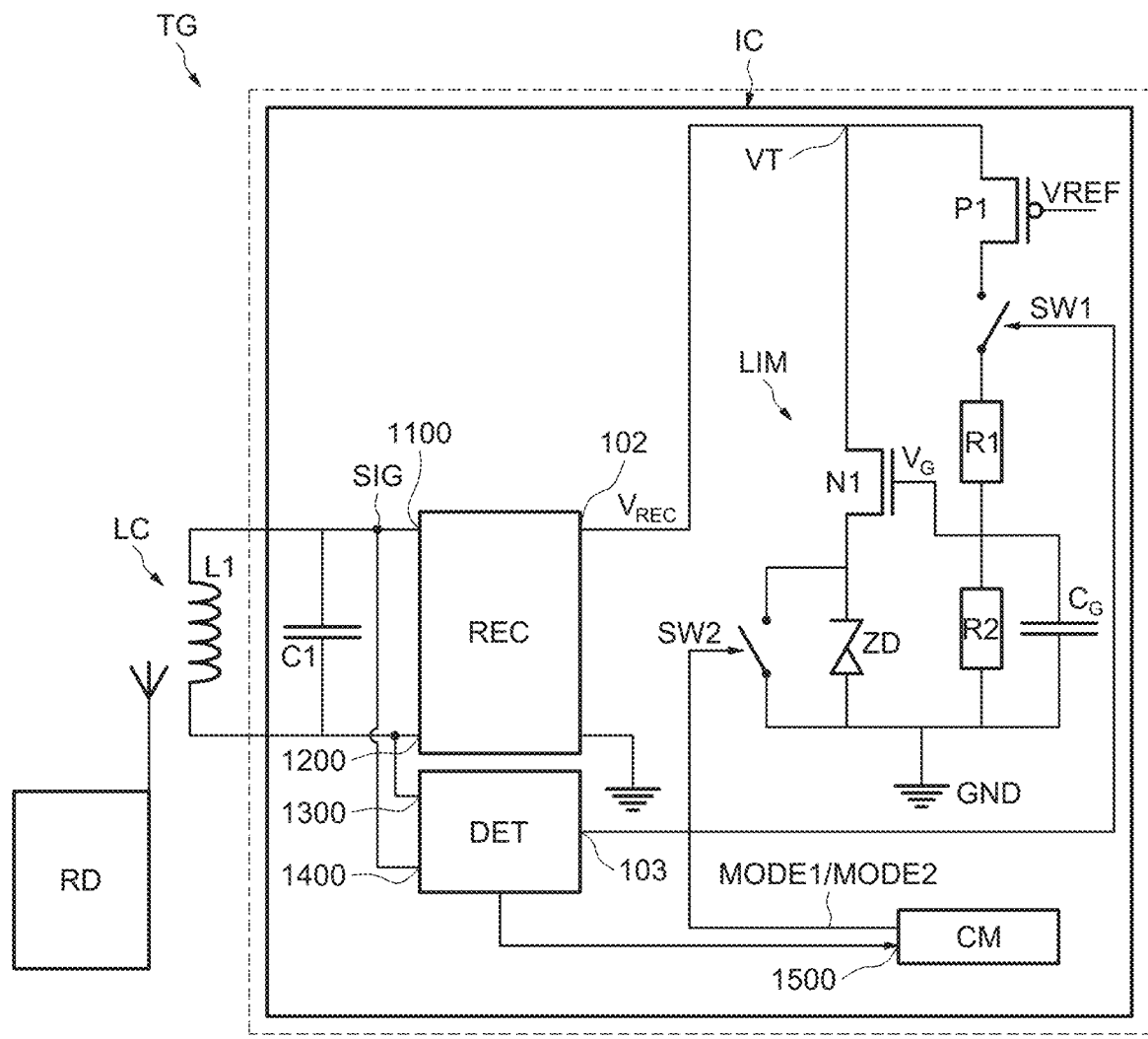
Figure 3C:
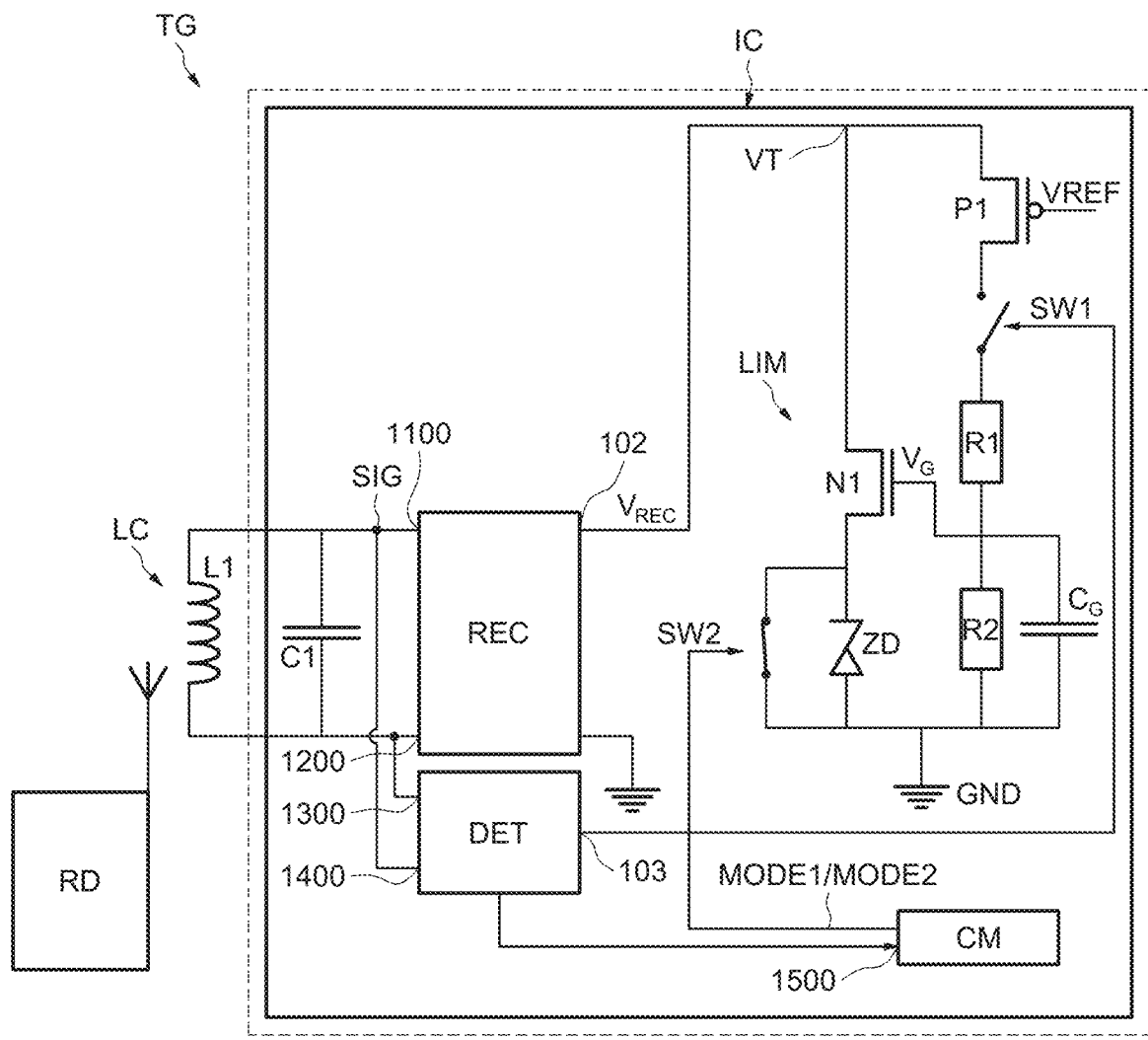

The limiter LIM being in the first configuration MODE1, the second switch SW2 controlled by the control circuit CM is off which means that the circuit acting like a Zener diode ZD is coupled in series with the NMOS transistor N1 as shown in FIG. 3B. This first configuration MODE1, reduces the limiter current when the tag TG receives an induced signal SIG with a low amplitude.

The first configuration MODE1 which isn't adapted to an OOK modulation, leads when the pulse PL1 is sent, to oscillations in the second graph GR2. These oscillations have relatively a high amplitude.

When the pulse PL2 is sent, the amplitude of the received pulse in tag TG as it is illustrated in the second graph GR2, still relatively high even if there is no remaining signal. The reason is that the limiter LIM is practically off when it's in the first configuration MODE1 which is adapted to an ASK modulation.

Once the OOK modulation is detected by detection circuit DET and CM (in this example it is after the two pulses PL1 and PL2), the control circuit CM closes the second switch SW2 to switch to the second configuration MODE2 which is adapted to an OOK modulation.

The switch SW2 being closed, the NMOS transistor N1 is now connected to the ground and no longer to the circuit acting as a Zener diode ZD which means that there is no reduction of limiter current when the amplitude of the induced signal SIG received by the tag TG is low.

Two other pulses are then sent PL3 and PL4. The third pulse PL3 has a remaining amplitude of 5% of non-modulated signal.

The fourth pulse PL4 has also a remaining amplitude of 5% of non-modulated signal.

In this case, when the limiter LIM is in the second configuration MODE2, the amplitude of the induced signal SIG is proportional to the amplitude of the reader's signal RD.

The reason of this proportionality is that the value of the limiter's impedance which was established before the reception of the modulated pulses remains unchanged during the reception of the induced signal SIG.

There are no oscillations and the amplitude of the received induced signal SIG isn't as high as seen before changing the limiter's configuration.

The detection level of the detection circuit DET is put in a lower level which helps to detect the rising edges of the modulated pulses quickly and so the variation of Frame Delay Time will be lower.

Of course, if detection circuit DET detects an ASK modulation at the beginning of the reception the induced signal SIG, the limiter remains in the first configuration MODE1 (switch SW2 open).

When the induced signal SIG modulated according to an ASK modulation is received, the resistive capacitive circuit doesn't react immediately when the amplitude of the induced signal SIG is reduced due to the ASK modulation. Thus, the NMOS transistor N1 continues to drain the same current.

When detection circuit DET detects the pulses of the ASK modulation, it opens the switch SW1 and the PMOS transistor P1 is disconnected.

The control voltage VG is maintained because of the capacitor CG, so the gate voltage of the NMOS transistor N1 remains unchanged and the current continues to flow.

When the voltage VREC starts to get close to Zener diode voltage ZD, the current through the NMOS transistor N1 is reduced and is completely disconnected once the voltage VREC becomes equal to Zener diode voltage ZD.

When detection circuit DET detects the pulses of the OOK modulation, it also opens the switch SW1 and the PMOS transistor P1 is disconnected.

What is claimed is:

1. A method for limiting a level of an induced signal received by a tag (TG) from a reader, the induced signal being modulated according to a protocol belonging to a group including protocols using amplitude shift keying (ASK) modulation and protocols using On Off Keying (OOK) modulation, the method comprising:
   providing the tag with a configurable limiter having a first configuration adapted to protocols using ASK modulation, and a second configuration adapted to protocols using OOK modulation;

setting the limiter in the first configuration until a protocol is detected; and in response to the protocol using OOK modulation being detected, switching the limiter from the first configuration to the second configuration.

2. The method according to claim 1, wherein the induced signal is modulated according to a protocol belonging to the group including protocols A and B of ISO/IEC14443 standard and protocol F of JIS.X.6319 standard.

3. The method according to claim 2, wherein switching the limiter from the first configuration to the second configuration comprises switching the limiter from the first configuration to the second configuration in response to the protocol A being detected.

4. The method according to claim 1, wherein the induced signal has modulated pulses, and wherein switching from the first configuration to the second configuration is done before reception of a last modulated pulse of the induced signal.

5. An integrated circuit, comprising:
an input configured to receive an induced signal that is modulated according to a protocol belonging to a group including protocols using ASK modulation and protocols using OOK modulation;
a detection circuit configured to detect the modulation of the induced signal;
a decoding circuit configured to detect the protocol;
a configurable limiter configured to limit a level of the induced signal and having a first configuration adapted to protocols using ASK modulation and a second configuration adapted to protocols using OOK modulation; and
a control circuit configured to set the limiter in the first configuration until a protocol is detected, and to switch the limiter from the first configuration to the second configuration in response to a protocol using OOK modulation being detected.

6. The integrated circuit according to claim 5, wherein the induced signal is modulated according to a protocol belonging to the group including protocols A and B of ISO/IEC14443 standard and protocol F of JIS.X.6319 standard.

7. The integrated circuit according to claim 6, wherein the control circuit is configured to switch the limiter from the first configuration to the second configuration in response to the protocol A being detected.

8. The integrated circuit according to claim 5, wherein the induced signal comprises modulated pulses and the control circuit is configured to switch from the first configuration to the second configuration before the input receives a final modulated pulse of the induced signal.

9. The integrated circuit according to claim 8, wherein in the first configuration, the limiter is configured to reduce a limiter's current when an amplitude of the induced signal is reduced.

10. The integrated circuit according to claim 9, wherein in the second configuration, the limiter is configured to no longer reduce the limiter's current when the amplitude of the induced signal is reduced.

11. The integrated circuit according to claim 10, wherein in the second configuration, the limiter is configured to keep a value of its impedance, which has been established before the input receives the modulated pulses, unchanged during reception of the induced signal.

12. The integrated circuit according to claim 5, wherein the limiter comprises a NMOS transistor coupled in series with a first switch and a Zener diode between a voltage terminal and a reference potential.

13. The integrated circuit according to claim 12, wherein the first switch is controlled by the control circuit, the control circuit being configured to open the first switch in the first configuration, and to close the first switch in the second configuration.

14. The integrated circuit according to claim 13, further comprising a PMOS transistor coupled in series with a second switch and a resistive-capacitive circuit between the voltage terminal and the reference potential.

15. The integrated circuit according to claim 14, wherein the second switch is controlled by the detection circuit, the detection circuit being configured to open the second switch when the detection circuit detects modulated pulses of the induced signal, and to close the second switch when a non-modulated signal is received.

16. A limiter, comprising:
a NMOS transistor coupled in series with a first switch and a Zener diode between a voltage terminal and a reference potential, wherein the limiter is configured to limit a level of an induced signal that is received at an input of an integrated circuit and that is modulated according to a protocol belonging to a group including protocols using ASK modulation and protocols using OOK modulation, the limiter having a first configuration adapted to protocols using ASK modulation and a second configuration adapted to protocols using OOK modulation.

17. The limiter according to claim 16, wherein the first switch is controlled by a control circuit, the control circuit being configured to open the first switch in the first configuration, and to close the first switch in the second configuration.

18. The limiter according to claim 16, further comprising a PMOS transistor coupled in series with a second switch and a resistive-capacitive circuit between the voltage terminal and the reference potential.

19. The limiter according to claim 18, wherein the second switch is controlled by a detection circuit configured to detect the modulation of the induced signal, the detection circuit being configured to open the second switch when the detection circuit detects modulated pulses of the induced signal, and to close the second switch when a non-modulated signal is received.

20. A transponder, comprising:
an integrated circuit, comprising:
an input configured to receive an induced signal that is modulated according to a protocol belonging to a group including protocols using ASK modulation and protocols using OOK modulation;
a detection circuit configured to detect the modulation of the induced signal;
a decoding circuit configured to detect the protocol;
a configurable limiter configured to limit a level of the induced signal and having a first configuration adapted to protocols using ASK modulation and a second configuration adapted to protocols using OOK modulation; and
a control circuit configured to set the limiter in the first configuration until a protocol is detected, and to switch the limiter from the first configuration to the second configuration in response to a protocol using OOK modulation being detected.

* * * * *